United States Patent Office 3,405,078
Patented Oct. 8, 1968

3,405,078
SENSITIZERS IN FOAM RUBBER
MANUFACTURE
Willem Jan van der Geer, Oosterbeek, Netherlands, assignor to The B. F. Goodrich Company, New York, N.Y., a corporation of New York
No Drawing. Filed Oct. 21, 1965, Ser. No. 500,318
5 Claims. (Cl. 260—2.5)

ABSTRACT OF THE DISCLOSURE

A sensitizer having the general formula

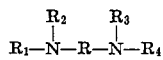

(wherein R is an alkylene group having from 1 to 4 carbon atoms, $R_1$ is a member selected from the group consisting of alkyl, cycloalkyl, hydroxy-substituted alkyl and hydroxy-substituted cycloalkyl groups having from 1 to 8 carbon atoms, $R_2$, $R_3$ and $R_4$ each is a member selected from the group consisting of hydrogen, alkyl, cycloalkyl, hydroxy-substituted alkyl and hydroxy-substituted cycloalkyl groups having from 1 to 8 carbon atoms and when $R_1$ and $R_2$ are considered together and when $R_3$ and $R_4$ are considered together they each represent an alkylene group having from 4 to 5 carbon atoms) is added to a compounded latex to improve the gelation characteristics of the latex. The latex is foamed in a conventional manner, is congealed and then vulcanized.

---

This invention relates to the manufacture of foam rubber and pertains more particularly to the manufacture of foam rubber employing nitrogen substituted diamines as sensitizers.

In the manufacture of foamed rubber by the delayed action gelling process a concentrated rubber latex, either natural and/or synthetic latex, after being compounded with conventional compounding ingredients, is frothed by whipping or beating to produce a froth that has discrete air bubbles dispersed in the latex matrix. Zinc oxide and a gelling agent such as sodium silicofluoride are added to the frothed latex to bring about gelation of the foam within a predictable time interval and the foam thereafter is poured into molds or spread onto a conveyor belt. After a few minutes, the latex sets to an irreversible gel and the resulting rubber product is vulcanized, washed and dried.

During the aforesaid gelation step, the latex particles of the frothed latex must be destablized to allow the latex particles to coagulate without the cells of dispersed air first collapsing. If the cell walls of the dispersed air bubbles collapse before the latex has gelled sufficiently, an unusable foam rubber product will result or, at best, a foam rubber product of poor physical properties will be obtained.

Sensitizers, often referred to as secondary gelling agents, of various types have been used to reduce the danger of cell collapse before the latex has gelled sufficiently. Some of the sensitizers that have been proposed are cationic soaps, the quanidines, certain phenols and polyamines such as triethyl trimethylene triamine (which is known as "trimine base"), triethylene tetramine and tetraethylene pentamine. Although the heretofore proposed sensitizers are somewhat effective in preventing collapse of the cells of the frothed latex as gelation, all of the various compounds that have been proposed suffer from one or more defects, principally, the objectionable effects which they have on certain physical properties of the foam rubber produced.

The sensitizers (secondary gelling agents) of the present invention are very effective when added to a latex in preventing cell collapse in the frothed latex at gelation and, in addition, produce no objectionable effects. To the contrary several desirable effects are noted. For example, they have the desirable feature that upon being compounded into a rubber latex they do not increase the viscosity of the latex, as do many of the sensitizers previously proposed. This is an important consideration in foam rubber manufacture since, when the viscosity of a frothed latex is too high, it is difficult to pour the frothed latex into molds or spread the frothed latex evenly onto a conveyor belt. Another advantageous feature observed when employing the sensitizers of this invention is that the resulting foam rubber has better physical properties (such as improved strength, improved compression resistance and greater elongation at break) than is normally obtainable when heretofore proposed sensitizers are added to the latex mix in the manufacture of foam rubber. The sensitizers or secondary gelling agents employed herein also have the desirable feature that they may be compounded into the latex a considerable time before the latex mix is intended to be used since storage of the resulting latex mix for prolonged periods of time have exhibited no adverse effects.

The secondary gelling agents or sensitizers of this invention are the nitrogen substituted diamines that have the general formula

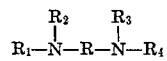

wherein R is an alkylene group having from 1 to 4 carbon atoms, $R_1$ is a member selected from the group consisting of alkyl, cycloalkyl, hydroxy-substituted alkyl and hydroxy-substituted cycloalkyl groups having from 1 to 8 carbon atoms; $R_2$, $R_3$ and $R_4$ each is a member selected from the group consisting of hydrogen, alkyl, cycloalkyl, hydroxy-substituted alkyl and hydroxy-substituted cycloalkyl groups having from 1 to 8 carbon atoms and when $R_1$ and $R_2$ are taken together and when $R_3$ and $R_4$ are taken together, represent an alkylene group having from 4 to 5 carbon atoms. A preferred class of sensitizers of this invention is the one wherein each nitrogen atom of the diamine is substituted with the two alkyl groups containing a secondary hydroxy group. The most preferred sensitizer for use in this invention is N,N,N',N'-tetra (2-hydroxypropyl) ethylene diamine represented by the following formula:

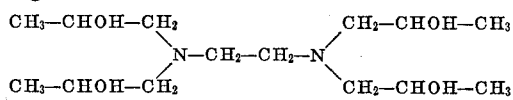

Either a single nitrogen substituted diamine embodied within this invention or a mixture of two or more of them can be used as the "sensitizer" for the latex mix. Generally from about 0.1 to 5 parts by weight of the sensitizer per 100 parts by weight dry rubber is employed. The sensitizer may be added directly to the latex before it is frothed or to the already frothed latex, although it is preferred to add the sensitizer to the latex before the latex is frothed. As indicated above, latex compounded with one or more of the sensitizers to which this invention pertains may be stored for long periods of time without affecting the properties of the latex, the processibility of the latex or the properties of the foam rubber prepared from the stored latex.

The latex mix to which the sensitizers of this invention have been added may be formed into foam rubber products using conventional processes. In other words, except for the use of the secondary gelling agents of the instant invention, the compounding of the latices, the vulcanization of the rubber, the washing and drying of the resulting foam rubber are the same as are conventionally used. Thus, the latices normally are compounded with conventional vulcanizing agents such as sulfur, conventional accelerators such as zinc diethyldithiocarbamate, conventional activators such as zinc oxide, conventional antioxidants and other commonly employed compounding ingredients.

When manufacturing foam rubber employing a delayed-action gelling agent (a process commonly referred to as the Dunlop Process) conventional delayed-action gelling agents and zinc oxide are used. The delayed-action gelling agents commercially used have comprised several types of chemical compounds including the fluo complexes which are commercially the most important. The fluo complexes include the fluo-silicates, fluostonmates, fluo-titanates and fluozirconates of sodium and potassium. Sodium silicafluoride, however, is the most generally used delayed-action gelling agent in the commercial manufacture of foam rubber by the Dunlop Process.

The latex used in the latex mix from which the foam rubber is manufactured may be a natural rubber latex (which essentially is an aqueous disperson of a polymer of isoprene), or a synthetic rubber latex, such as an aqueous dispersion of a rubbery polymer of an open-chain conjugated diolefin having from four to eight carbon atoms exemplified by butadiene-1,3; 1,4-dimethyl butadiene-1,3; 2,3-dimethyl butadiene-1,3, and the like, or of rubbery copolymers of such diolefins and similar conjugated diolefins with each or with copolymerizable monomeric materials containing a single ethylenic linkage exemplified by styrene, methyl acrylate, methyl methacrylate, ethyl acrylate, ethyl methacrylate, acrylonitrile, or similar materials, or of rubbery polymers of chloroprene and the like, or a blend of a natural latex with a synthetic latex or a blend of synthetic latices.

This invention will be further illustrated by the following examples:

EXAMPLE I

A series of foam rubbers was prepared in accordance with the following recipe. The values stated are parts by dry weight unless otherwise indicated.

|  | Concentration (aqueous dispersion) | Latex 1 | Latex 2 | Latex 3 | Latex 4 |
|---|---|---|---|---|---|
| Styrene-butadiene copolymer (30/70) | 63 | 100 | 100 | 100 | 100 |
| Secondary gelling agent: | | | | | |
| A[1] | | | 0.5 | 1.0 | |
| B[2] | | | | | 0.5 |
| Trimene base[3] | 50 | 1.0 | | | |
| Sulphur | 50 | 2.25 | 2.25 | 2.25 | 2.25 |
| Zinc ethyl-phenyl dithiocarbamate (accelerator) | 50 | 1.0 | 1.0 | 1.0 | 1.0 |
| Sym. di-beta naphthyl-p-phenylenediamine (antioxidant) | 50 | 1.0 | 1.0 | 1.0 | 1.0 |
| Cetyl trimethylammonium bromide | 10 | 0.5 | 0.5 | | 0.5 |
| Zinc oxide | 50 | 3.0 | 3.0 | 3.0 | 3.0 |
| Sodium silicofluoride | 25 | (4) | (4) | (4) | (4) |

[1] N,N,N',N'-tetra (2-hydroxybutyl) ethylenediamine.
[2] Equimolecular mixture of N,N,N',N'-tetra (2-hydroxybutyl) ethylenediamine and N,N'-di(2-hydroxybutyl) ethylenediamine.
[3] Triethyl trimethylene tetramine.
[4] An amount sufficient to cause gelation within 8 to 10 minutes, 2.0 to 3.5 parts by weight.

Except for the zinc oxide and the sodium silicofluoride, the latex blends were whipped in the usual manner to produce a foam. The foam obtained was subsequently mixed with the zinc oxide and the sodium silicofluoride after which is was poured into molds to form sheets. After gelation of the foam sheets, the rubber was vulcanized in the usual way with the aid of steam, after which the foam rubber sheets were washed and dried. The foam rubber sheets were numbered the same as the latex mix from which they were prepared. It was observed that the dried foam rubber sheets Nos. 2, 3 and 4 showed a more homogeneous and more regular cell structure than sheet No. 1.

The following physical properties of the four sheets were measured and are as follows:

| | Foam Rubber Sheet No. | | | |
|---|---|---|---|---|
| | 1 | 2 | 3 | 4 |
| Tensile strength (g./cm.²) | 810 | 950 | 840 | 1,150 |
| Elongation at break, percent | 190 | 240 | 260 | 220 |
| Permanent loss of dimensional stability, percent | 11 | 10 | 10 | 10 |
| Relative compression resistance, percent | −4 | 24 | 6 | 26 |
| Loss of compression resistance after fatigue tests, percent | 4 | 3 | 0 | 10 |

As can be seen from the results of the above-mentioned tests, foam rubber sheets Nos. 2, 3 and 4 (which were compounded with secondary gelling agents of this invention) have superior physical properties than foam rubber sheet No. 1 which was compounded with the conventional secondary gelling agent "trimene base."

EXAMPLE II

In this example, a series of latices was compounded with secondary gelling agents of this invention and a conventional gelling agent. Part of each latex mix was immediately made into foam rubber. Another part of each latex mix was stored four (4) weeks and then made into foam rubber. A remaining part was stored for seventeen (17) weeks and then made into foam rubber.

The following recipes were used to prepare the series of latices. The values used are dry parts by weight.

| | Latex 5 | Latex 6 | Latex 7 | Latex 8 | Latex 9 |
|---|---|---|---|---|---|
| Styrene-butadiene copolymer latex (30/70), 63 percent concentration | 100 | 100 | 100 | 100 | 100 |
| Secondary gelling agent: | | | | | |
| A[1] | 0.5 | 0.1 | | | |
| B[2] | | | 0.5 | 0.1 | |
| Triamine base | | | | | 1.0 |
| Sulphur | 2.25 | 2.25 | 2.25 | 2.25 | 2.25 |
| Zinc diethyl dithiocarbamate | | | | | 0.75 |
| Zinc mercaptobenzothiazole | | | | | 1.0 |
| Zinc ethyl phenyl dithiocarbamate | 1.0 | 1.0 | 1.0 | 1.0 | |
| Sym. di-beta naphthyl p-phenylenediamine | 1.3 | 1.0 | 1.0 | 1.0 | 1.0 |
| Cetyl trimethylammonium bromine | 0.5 | | 0.5 | | 0.5 |
| Zinc oxide | 3.0 | 3.0 | 3.0 | 3.0 | 3.0 |
| Sodium silicofluoride | (3) | (3) | (3) | (3) | (3) |

[1] N,N,N',N'-tetra (2-hydrxybutyl) ethylenediamine.
[2] Equimolecular mixture of N,N,N',N'-tetra (2-hydroxybutyl) ethylenediamine and N,N'-di(2-hydroxybutyl) ethylenediamine.
[3] An amount sufficient to cause gelation within 5 to 10 minutes, 2.0 to 3.5 parts by weight.

The foam rubber was prepared in the same manner as described in Example I. No physical changes were observed in the various latices upon aging.

The foam rubber sheets were given the same number as the latex mix from which they were prepared. The following properties were measured:

|  | Storage of latex, in weeks | Foam Rubber Sheet No. | | | | |
|---|---|---|---|---|---|---|
|  |  | 5 | 6 | 7 | 8 | 9 |
| Tensile strength (in g./cm.²) | 0 | 1,180 | 990 | 1,110 | 1,080 | 640 |
|  | 4 | 1,060 | 970 | 1,300 | 1,270 | 750 |
|  | 17 | 1,280 | 1,000 | 1,380 | 1,460 | 670 |
| Elongation at break, percent | 0 | 215 | 235 | 260 | 230 | 135 |
|  | 4 | 230 | 235 | 250 | 235 | 160 |
|  | 17 | 225 | 240 | 205 | 285 | 145 |
| Permanent loss of compression resistance percent | 0 | 12.5 | 9.6 | 10.1 | 9.4 | 15 |
|  | 4 | 9.2 | 8.9 | 12.3 | 9.6 | 13.3 |
|  | 17 | 11.8 | 12.7 | 13.3 | 14.3 | 12.2 |

As can be seen from the above test results, the latices compounded with the secondary gelling agents of this invention suffer no adverse effects upon aging. The test results also indicate the supremacy of the secondary gelling agents of this invention over trimene base.

EXAMPLE III

A series of latices were prepared using various secondary gelling agents of this invention in order to show that the latices compounded with these secondary gelling agents have viscosities that allow the latices to be easily processed. The following recipes were used wherein the values shown are dry parts by weight:

|  | Latex | | | | | | |
|---|---|---|---|---|---|---|---|
|  | 10 | 11 | 12 | 13 | 14 | 15 | 16 |
| Styrene-butadiene copolymer (30/70) | 100 | 100 | 100 | 100 | 100 | 100 | 100 |
| Sulphur | 2.25 | 2.25 | 2.25 | 2.25 | 2.25 | 2.25 | 2.25 |
| Zinc ehtyl phenyl dithiocarbamate | 1.0 | 1.0 | 1.0 | 1.0 | 1.0 | 1.0 | 1.0 |
| Antioxidant | 1.0 | 1.0 | 1.0 | 1.0 | 1.0 | 1.0 | 1.0 |
| Secondary gelling agent: |  |  |  |  |  |  |  |
| N,N,N',N' tetra (hydroxyehtyl) ethylenediamine | 1.0 |  |  |  |  |  |  |
| N,N,N',N' tetra (2-hydroxypropyl) ethylenediamine |  | 1.0 |  |  |  |  |  |
| N,N,N',N' tetra (2-hydroxybutyl) ethylenediamine |  |  | 1.0 |  |  |  |  |
| N,N,N',N' tetrabutyl ethylenediamine |  |  |  | 1.0 |  |  |  |
| N,N,N',N' tetra 2-(hydroxybutyl) propylene diamine |  |  |  |  | 1.0 |  |  |
| N,N,N',N' tetra (2-hydroxybutyl) hexylene diamine |  |  |  |  |  | 1.0 |  |
| N-cyclohexyl propylenediamine |  |  |  |  |  |  | 1.0 |

The viscosity of each compounded latex was measured with a Brookfield Viscosimeter (Type RVF-spindle, 20 r.p.m.) and are tabulated below.

The latices were frothed to a point where the foam had a density of about 100 kilograms per cubic meter. The standard amounts of zinc oxide and sodium silicofluoride were mixed into the foam. The foams were then poured into open molds. During gelation, the foams were visually observed and the stability of the foam was recorded. The stability of the foam is directly related to the effectiveness of the secondary gelling agents.

| Latex | Latex Viscosity (centipoise) | Foam Stability |
|---|---|---|
| 10 | 360 | Moderate. |
| 11 | 370 | Excellent. |
| 12 | 1,150 | Satisfactory. |
| 13 | 300 | Moderate. |
| 14 | 1,150 | Do. |
| 15 | 2,650 | Do. |
| 16 | 400 | Moderate to Good. |

EXAMPLE IV

The gelled latex foams numbered 11, 12, 13 and 16 of Example III were vulcanized, washed and dried in the usual manner. The foam rubbers obtained were compared to a foam rubber obtained in the usual manner from a compounded latex having the following recipe:

| | |
|---|---|
| Styrene-butadiene copolymer (30/70) | 100 |
| Trimene base | 1.0 |
| Sulphur | 2.25 |
| Zinc ethyl phenyl dithiocarbamate | 1.0 |
| Antioxidant | 1.0 |
| Cetyltrimethylammoniumbromide | 0.5 |
| Zinc oxide | 3.0 |
| Sodium silicofluoride | (¹) |

¹ An amount sufficient to cause gelation within 8 to 10 minutes.

The foam rubber sample obtained from the above latex mix containing the trimene base was numbered Sample 17 and the foam rubber samples obtained from latex mixes Nos. 11, 12, 13 and 16 were given corresponding numbers.

|  | Foam Rubber Sample No. | | | | |
|---|---|---|---|---|---|
|  | 11 | 12 | 13 | 16 | 17 |
| Tensile strength (g./cm.²) | 970 | 950 | 1,100 | 920 | 750 |
| Elongation at break, percent | 265 | 280 | 230 | 255 | 190 |

The table shows that foam rubber sample Nos. 11, 12, 13 and 16, which were prepared from latices containing a secondary gelling agent within the purview of this invention, have superior tensile strengths and percent elongations at break than foam rubber Sample No. 17 which was prepared from a latex that contained the conventional secondary gelling agent, trimene base.

Although in the discussion of this invention the delayed-action gelling agent process of making latex foam rubber has been used solely in the discussion of the invention, the sensitizers of this invention are not limited to use in such process, but are useful also in the process of manufacturing latex foam rubber wherein the latex is gelled by freezing and the gelled latex is congealed by passing a coagulating gas such as carbon dioxide through the gelled latex and which is known as the "Talalay Process." It has been found that when the sensitizers of this invention are used in the "Talalay Process" a latex foam rubber having improved properties is obtained.

I claim:

1. In the manufacture of latex foam rubber from a compounded natural rubber latex or a compound synthetic rubber latex selected from the group of synthetic latices which consists of aqueous dispersion of rubbery polymer of an open-chain conjugated diolefin having from four to eight carbon atoms, aqueous dispersions of rubbery copolymers of said diolefins with each other or with copolymerizable monomeric materials containing a single ethylenic linkage, aqueous dispersions of rubbery polymers of chloroprene or a compounded blend of natural rubber latex with a synthetic latex or a blend of synthetic latices, which manufacture includes the steps of foaming the latex, congealing the foamed latex and vulcanizing the congealed latex foam, the improvement which comprises the addition to the latex before gelation of a sensitizer having the general formula

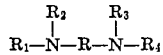

wherein R is an alkylene group having from 1 to 4 carbon atoms, $R_1$ is a member selected from the group consisting of alkyl, cycloalkyl, hydroxy-substituted alkyl and hydroxy-substituted cycloalkyl groups having from 1 to 8 carbons atoms, $R_2$, $R_3$ and $R_4$ each is a member selected from the group consisting of hydrogen, alkyl, cycloalkyl, hydroxy-substituted alkyl and hydroxy-substituted cycloalkyl groups having from 1 to 8 carbon atoms and when $R_1$ and $R_2$ are taken together and when $R_3$ and $R_4$ are taken toegther they each represent an alkylene group having from 4 to 5 carbon atoms.

2. The process of claim 1 wherein the sensitizer is N,N,N',N'-tetra(2-hydroxypropyl)ethylene diamine.

3. The process of claim 5 wherein the chemical gelling agent is sodium silicofluoride.

4. The process of claim 5 wherein the chemical gelling agent is sodium silicofluoride and the sensitizer is N,N,N',N'-tetra(2-hydroxypropyl)ethylene diamine.

5. The process of claim 1 wherein a chemical gelling agent is added to the latex.

References Cited

UNITED STATES PATENTS

| | | | |
|---|---|---|---|
| 2,776,330 | 1/1957 | Jones et al. | 260—2.5 |
| 3,015,641 | 1/1962 | Bawn et al. | 260—2.5 |

FOREIGN PATENTS

| | | |
|---|---|---|
| 543,878 | 7/1957 | Canada. |
| 545,389 | 8/1957 | Canada. |
| 550,288 | 12/1957 | Canada. |

MURRAY TILLMAN, *Primary Examiner.*

M. FOELAK, *Assistant Examiner.*